United States Patent
Pino, Jr. et al.

(10) Patent No.: US 10,571,045 B2
(45) Date of Patent: *Feb. 25, 2020

(54) METHOD OF FILLING AND SEALING A MICROTRENCH AND A SEALED MICROTRENCH

(71) Applicant: CORBEL COMMUNICATIONS INDUSTRIES, LLC, Bronx, NY (US)

(72) Inventors: Angelo J. Pino, Jr., New York, NY (US); Daniel Urban, Austin, TX (US)

(73) Assignee: CCIIP LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/183,780

(22) Filed: Nov. 8, 2018

(65) Prior Publication Data

US 2019/0086002 A1    Mar. 21, 2019

Related U.S. Application Data

(63) Continuation-in-part of application No. 16/000,628, filed on Jun. 5, 2018, which is a continuation of application No. 15/878,945, filed on Jan. 24, 2018, now abandoned, which is a continuation-in-part of application No. 15/785,967, filed on Oct. 17, 2017.

(Continued)

(51) Int. Cl.
| | | |
|---|---|---|
| *F16L 1/11* | (2006.01) | |
| *H02G 1/06* | (2006.01) | |
| *E02F 5/12* | (2006.01) | |
| *F16L 1/028* | (2006.01) | |
| *H02G 9/02* | (2006.01) | |
| *H02G 9/06* | (2006.01) | |
| *E02F 5/10* | (2006.01) | |
| *E02F 9/24* | (2006.01) | |
| *E02F 5/22* | (2006.01) | |
| *E02F 5/08* | (2006.01) | |

(52) U.S. Cl.
CPC .................. *F16L 1/11* (2013.01); *E02F 5/08* (2013.01); *E02F 5/10* (2013.01); *E02F 5/101* (2013.01); *E02F 5/12* (2013.01); *E02F 5/226* (2013.01); *E02F 9/245* (2013.01); *F16L 1/028* (2013.01); *H02G 1/06* (2013.01); *H02G 9/02* (2013.01); *H02G 9/06* (2013.01); *H02G 9/025* (2013.01)

(58) Field of Classification Search
CPC .................................. H02G 9/00; G02B 6/504
See application file for complete search history.

(56) References Cited

U.S. PATENT DOCUMENTS

| | | |
|---|---|---|
| 4,668,548 A | 5/1987 | Lankard |
| 4,744,693 A | 5/1988 | Smith |

(Continued)

OTHER PUBLICATIONS

King, "Google Fiber finishes digging very shallow grave in Louisville, KY. #RIP," https:/lwww.pocketables.com/2019/021 Jooglefiber-finishes-digging-very-shallow-grave-in-louisville-ky-rip.html, published on Pocketable on Feb. 7, 2019, pp. 1-9.

(Continued)

*Primary Examiner* — Sean D Andrish
(74) *Attorney, Agent, or Firm* — Jeffrey S. Melcher; Melcher Patent Law PLLC

(57) ABSTRACT

Provided is a microtrench fill comprising cement, a polymer, and a colorant. Also provided is a method of using the microtrench fill to fill a microtrench in a roadway.

26 Claims, 20 Drawing Sheets

Related U.S. Application Data

(60) Provisional application No. 62/554,562, filed on Sep. 5, 2017, provisional application No. 62/551,311, filed on Aug. 29, 2017, provisional application No. 62/537,723, filed on Jul. 27, 2017, provisional application No. 62/458,370, filed on Feb. 13, 2017, provisional application No. 62/432,428, filed on Dec. 9, 2016, provisional application No. 62/409,486, filed on Oct. 18, 2016.

(56) References Cited

U.S. PATENT DOCUMENTS

| | | | | |
|---|---|---|---|---|
| 4,812,078 | A * | 3/1989 | Rivard | E02F 5/08 405/174 |
| 5,244,304 | A | 9/1993 | Weil | |
| 5,913,638 | A | 6/1999 | Lansdale | |
| 7,914,618 | B1 * | 3/2011 | Krozel | C04B 28/04 106/606 |
| 9,485,468 | B2 | 11/2016 | Pino | |
| 2004/0149174 | A1 * | 8/2004 | Farrington | C04B 24/12 106/802 |
| 2005/0036749 | A1 | 2/2005 | Vogel | |
| 2013/0011198 | A1 | 1/2013 | Purcell | |
| 2013/0284070 | A1 * | 10/2013 | Dubey | C04B 11/28 106/695 |
| 2015/0125218 | A1 | 5/2015 | Gustavsson | |
| 2016/0376767 | A1 | 12/2016 | Miller | |

OTHER PUBLICATIONS

Blum, "Microtrenching fail drives Google Fiber out of Louisville," https://lwww.tellusventure.com/blog/microtrenching- ail-drives-google-fiber-out--of-louisville/, published on Tellus Venture Associates, Feb. 8, 2019, pp. 1-3.

Otts, "Where is Google Fiber? Mostly in the Highlands, records show," hllps://www.wdrb.com/news/business/sunday- 3edition-where-is-google-fiber-moslly-in-the-highlands/article _ 569112e0-421 e-58ef-be24-c2e42e5e53d2.html, published in the Sunday Edition, WDRB, Sep. 14, 2018, pp. 1-10.

\* cited by examiner

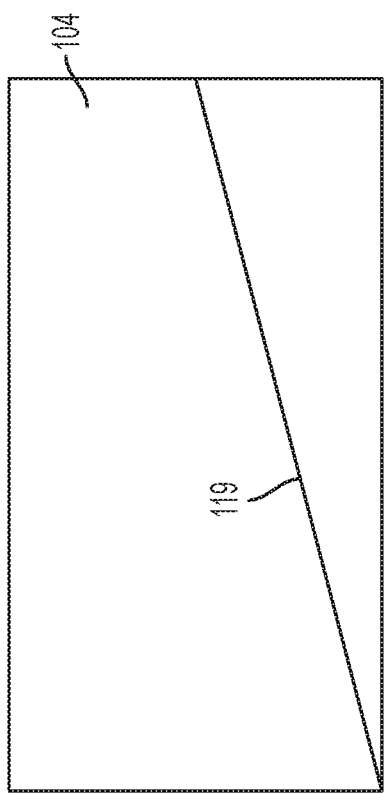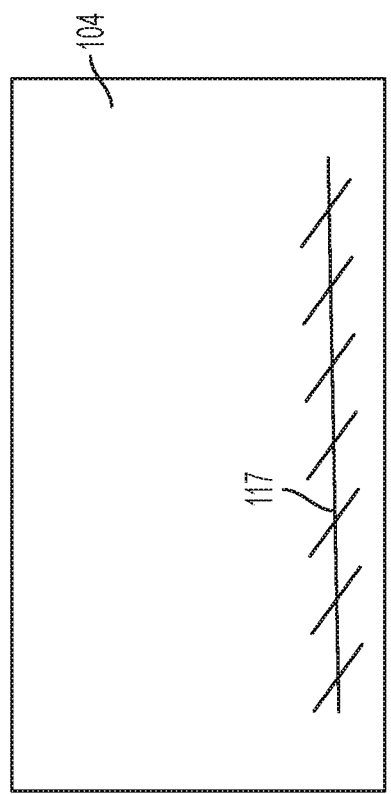
FIG. 6B
FIG. 6C

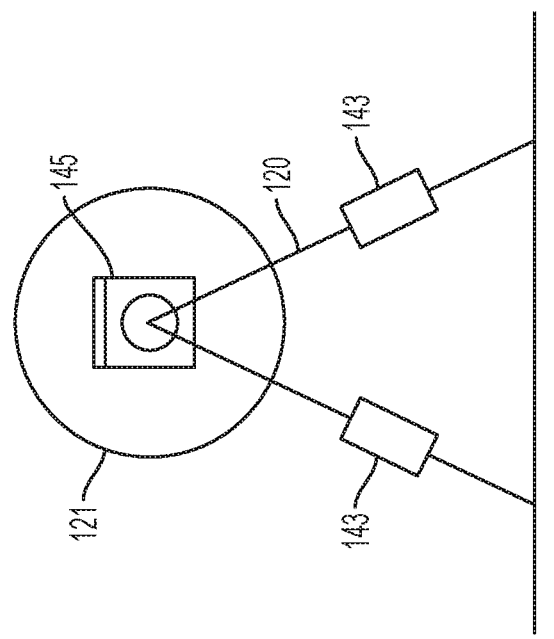

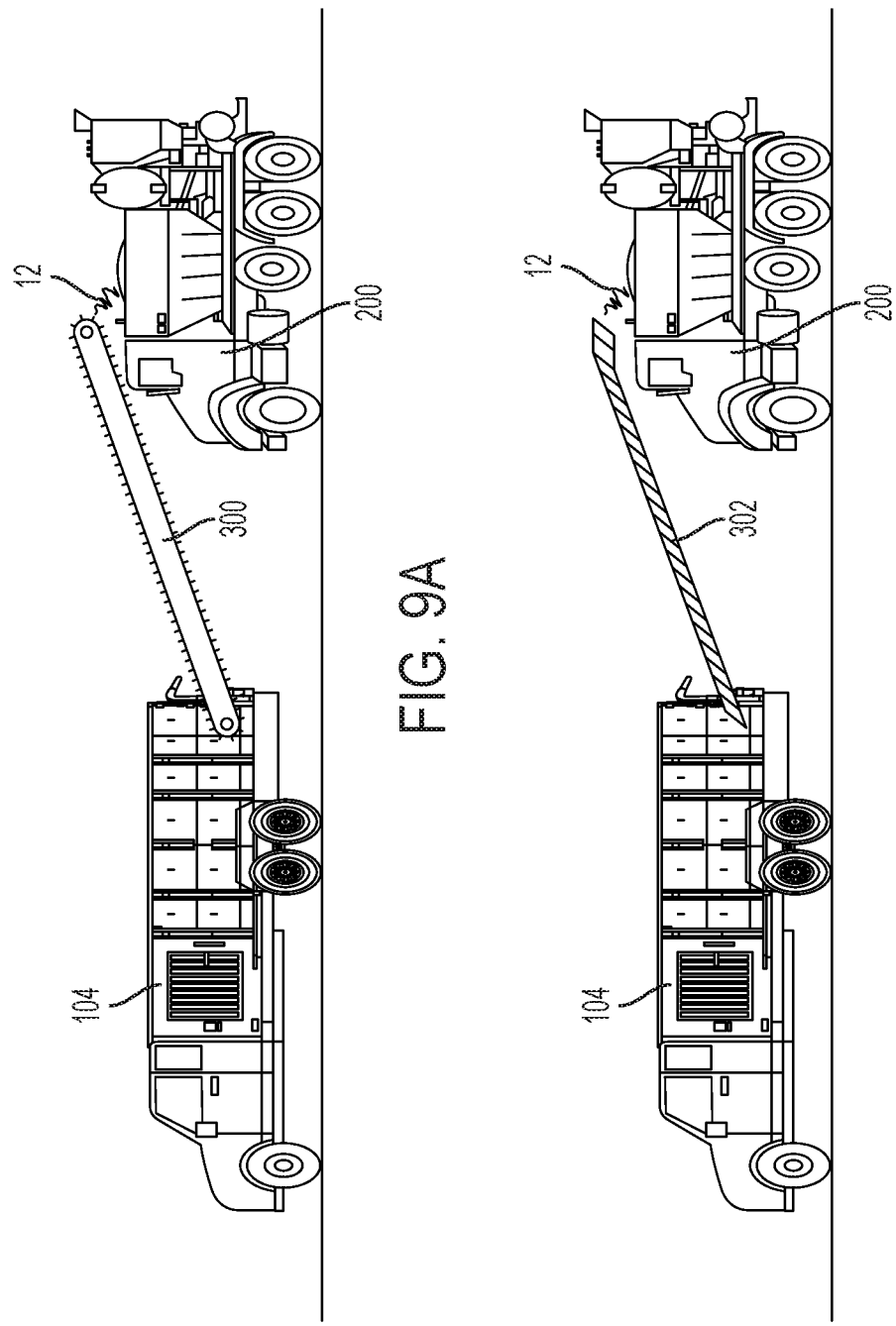

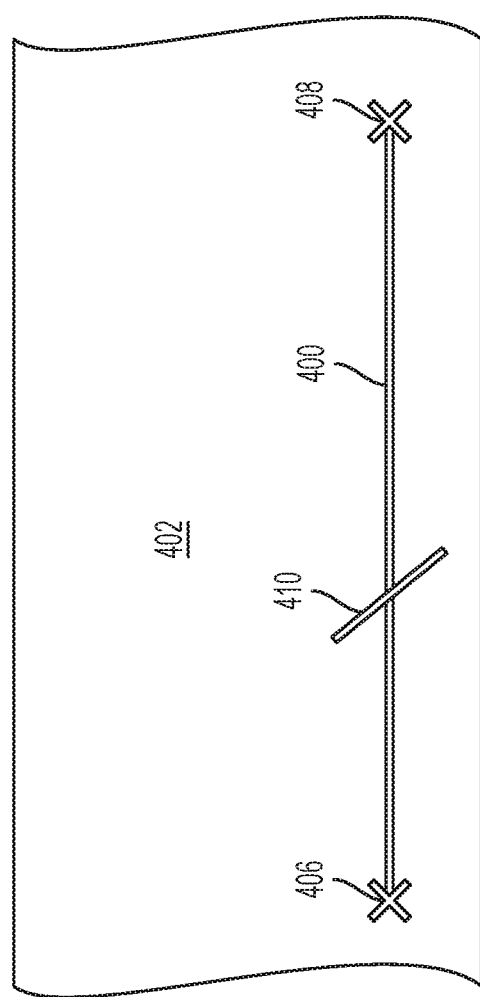

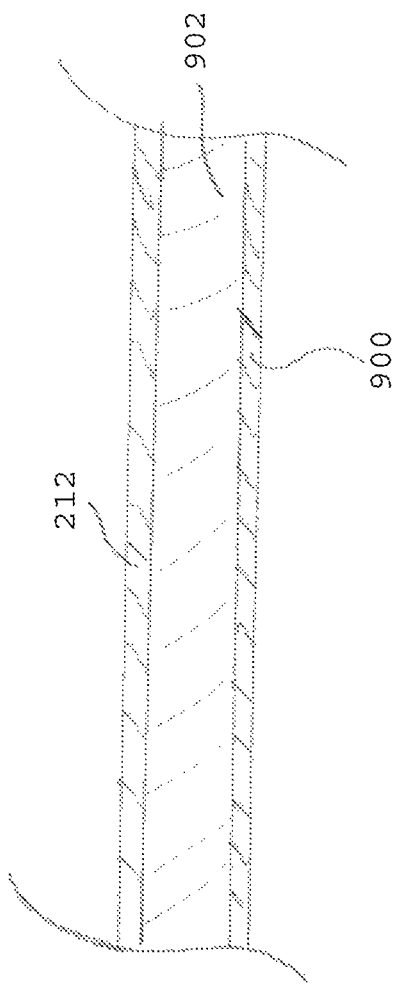

METHOD OF FILLING AND SEALING A MICROTRENCH AND A SEALED MICROTRENCH

FIELD OF THE INVENTION

The invention generally relates to a method of continuously filling and sealing a microtrench.

BACKGROUND OF THE INVENTION

Conventional devices for the trenching and laying cable or duct cannot be used continuously. The micro trencher saw usually creates a pile of spoil (dirt, asphalt, concrete, etc.) alongside the formed trench and the trench must be cleaned before laying the cable in the trench. The pile of spoil must then be removed. A fill, also referred to as cement or grout, is inserted into the trench on top of the cable or innerduct/microduct. Large industrial vacuum trailers have been used to remove the piled up spoil. However, many hours are wasted by having to dump the spoil from the trailers.

There is a great need for a device that can be used to continuously remove and in some instances recycle the spoil to in effort to increase the speed for placing the cable and/or innerduct/microduct and to reduce the down time of roadways, and also to reduce production costs.

While the vacuum truck concept is known in the industry, there is no current vacuum system that allows one to use a second vacuum or one vacuum to expel the cutting spoils into a cement/zim mixer or container allowing for the material to be recycled.

Installing new optical fiber networks to a location is expensive and time consuming. There is a great need for faster and less expensive installation of optical fiber networks.

SUMMARY OF THE INVENTION

An objective of the invention is to provide an improved microtrench fill and a method of continuously filling a microtrench.

The above objectives and other objectives can be obtained by a method of filling and sealing a microtrench on a roadway to return the roadway to an original state with a color-matched, filled and sealed microtrench comprising:

forming a flowable concrete-based fill in a fill device by mixing together a cement, a polymer bonding agent, a colorant, an aggregate, and water, wherein the colorant provides the flowable concrete-based fill with a color substantially matching the color of the roadway, the polymer bonding agent provides adhesion to the existing roadway to seal the microtrench against water infiltration, the flowable concrete-based fill having a final set time of 2 hour or less, and the flowable concrete-based fill is configured to flow into the microtrench from a fill device; and continuously filling the microtrench with the flowable concrete-based fill material from the fill device to cover the optical fiber and/or innerduct/microduct, fill and seal the microtrench and return the roadway substantially back to an original state with the color-matched, filled and sealed microtrench.

The above objectives and other objectives can be obtained by a method of filling and sealing a microtrench on a roadway to return the roadway to an original state with a color-matched, filled and sealed microtrench comprising:

forming a flowable concrete-based fill in a fill device by mixing together a cement, a polymer bonding agent, an aggregate, and water, wherein the polymer bonding agent provides adhesion to the existing roadway, the flowable concrete-based fill having a final set time of 2 hour or less, and the flowable concrete-based fill is configured to flow into the microtrench from a fill device; and continuously filling the microtrench with the flowable concrete-based fill material from the fill device to simultaneously cover the optical fiber and/or innerduct/microduct, fill and seal the microtrench and return the roadway substantially back to an original state with the filled and sealed microtrench.

BRIEF DESCRIPTION OF THE DRAWINGS

FIG. 6B illustrates a container device having a sloping floor.

FIG. 6C illustrates a container device having a mechanical moving system.

FIG. 7 illustrates a reel.

FIG. 9A illustrates an embodiment of spoil transport device.

FIG. 9B illustrates an embodiment of spoil transport device.

FIG. 10 illustrates a marker line.

FIG. 12 illustrates a device identifier fill over a buried device.

DETAILED DESCRIPTION OF THE INVENTION

Figure 1:
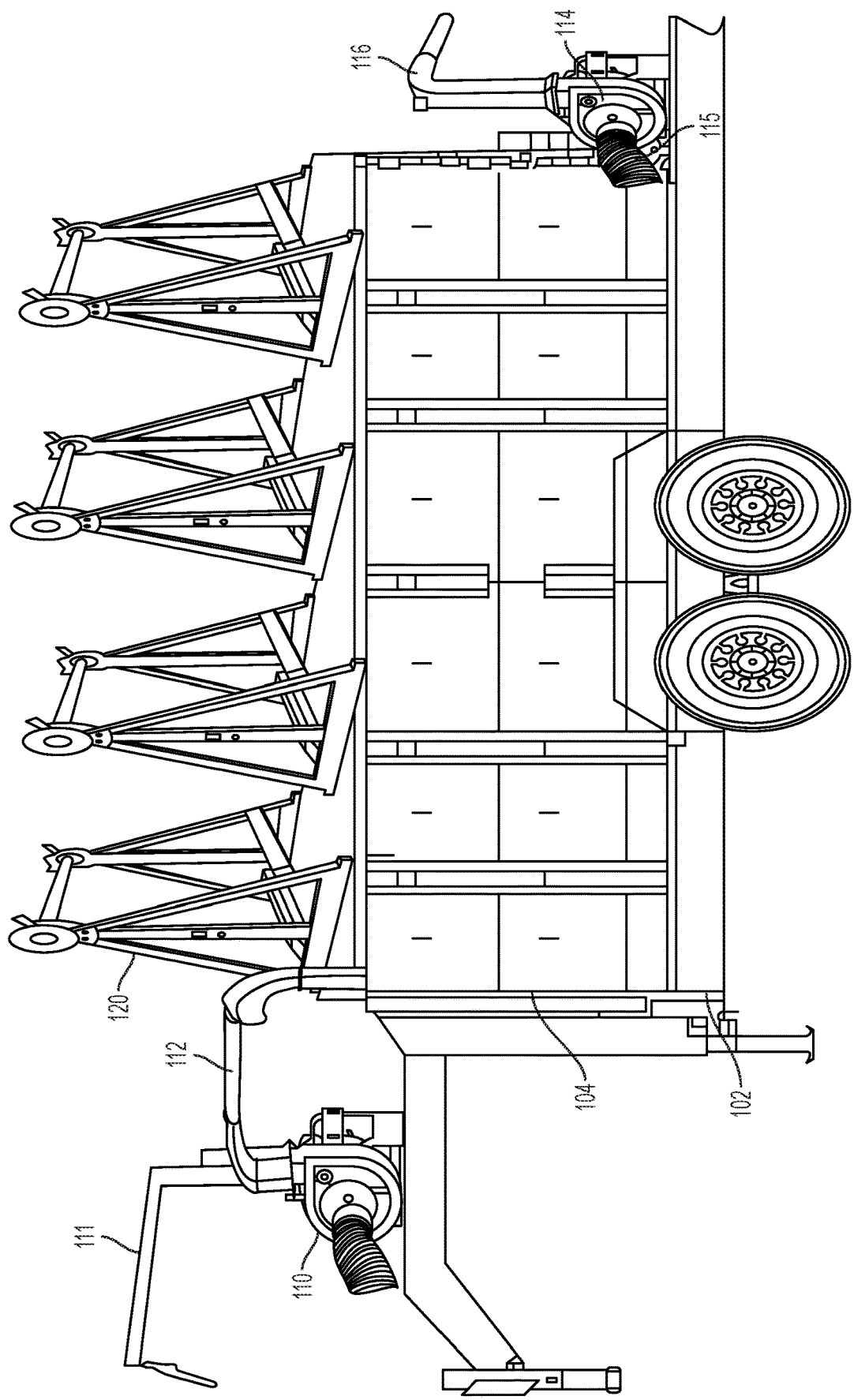
FIG. 1 illustrates a side view of a multifunctional reel carrier, spoil material handling container device.
Figure 2:
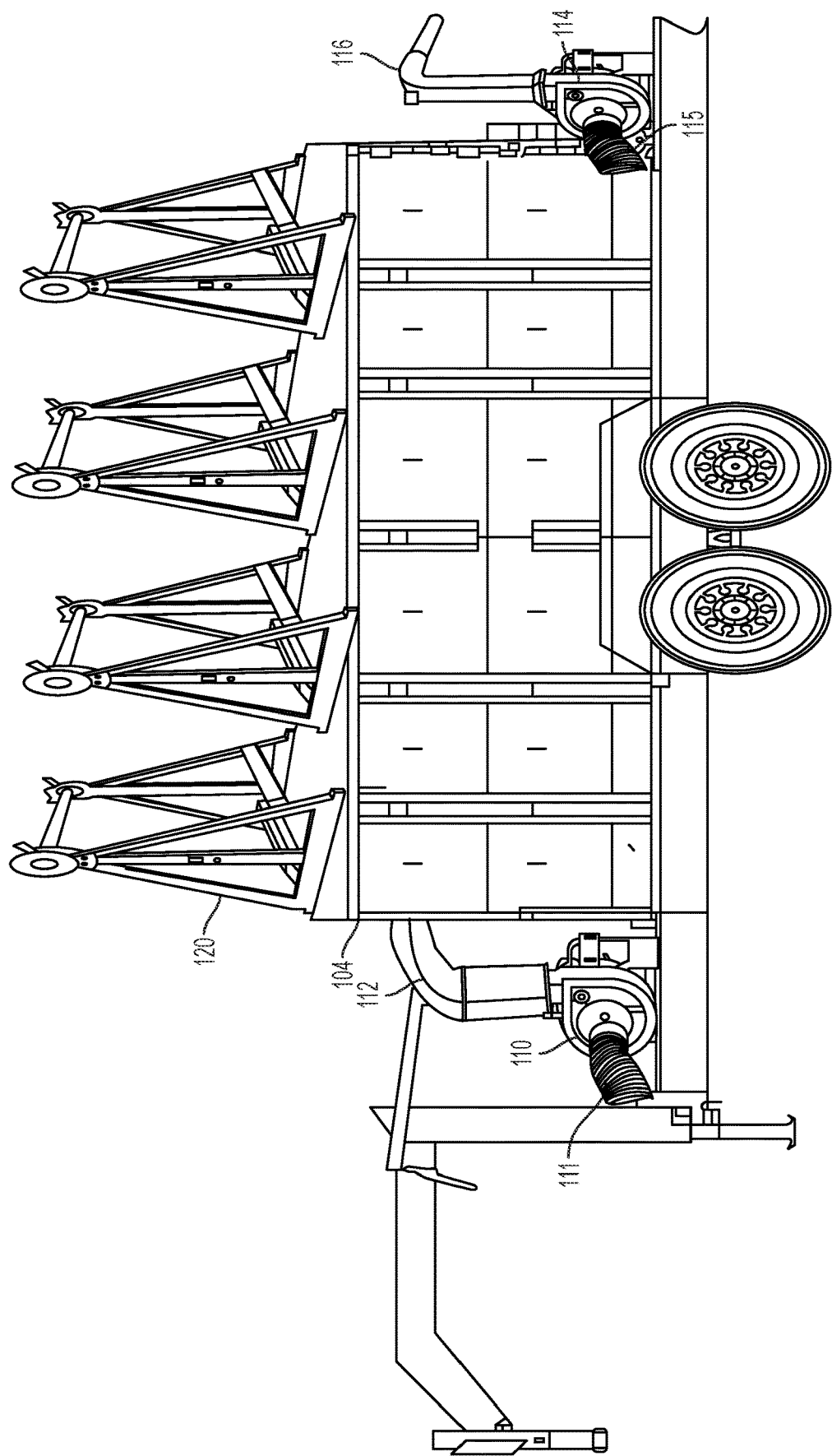
FIG. 2 illustrates a side view of a multifunctional reel carrier, spoil material handling container device.

In the following description, for purposes of explanation and not limitation, specific details are set forth, such as particular networks, communication systems, computers, terminals, devices, components, techniques, data and network protocols, software products and systems, operating systems, development interfaces, hardware, etc. in order to provide a thorough understanding of the present invention with reference to the attached non-limiting figures.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description.

As shown in FIGS. 1-4, the multifunctional reel carrier, spoil material handling container device 100 comprises a trader or truck bed 102 so that the multifunctional reel carrier, spoil material handling container device 100 can be moved along with a micro trencher 2. The size of the trailer or bed 102 can be any desired size, for example from 5 to 40 feet. The multifunctional reel carrier, spoil material handling container device 100 includes at least a first container 104 sized to hold spoil 12 created by the saw (such as a cutting wheel) 10 cutting a microtrench 11, for example from 50 to 4,000 cubic feet in size. The first container 104 is constructed to hold the spoil 12. A first vacuum device 110 has an inlet 111 disposed at the micro trencher 2 to suck up the spoil 12, and optionally to also remove spoil 12 from the microtrench 11. An outlet 112 of the first vacuum device 110 deposits the spoil 12 into the first container 104. A second vacuum device 114 has an inlet 115 connected to the first container 104 to remove spoil from the first container 104 and an outlet 116 connected to a fill device 200. Thus, the multifunctional reel carrier, spoil material handling container device 100 is constructed to move spoil 12 from the micro trencher 2 to the first container 104 and then to the fill device 200. Instead of the fill device 200, the second vacuum device 114 can move the spoil to a truck or other vehicle 300 for removal of the spoil from the job site or to recycle the spoil back into the microtrench. The first container 104 has at least one outlet 118 can have a filter to prevent spoil from being ejected into the air. The outlet 118 can allow air to enter or leave the first container 104. The device 100 includes at least one reel holder 120 constructed to hold a reel 121 of cable or innerduct/microduct 140. The multifunctional reel carrier, spoil material handling container device 100 preferably includes a plurality of reel holders 120 that can be adjusted in height and moved manually or mechanically/hydraulically from front to back, back to front, side to side, or up and down.

To facilitate vacuuming of the spoil 12 from the container 104, different methods to move the spoil 12 within the container 104 can be utilized. Examples of suitable methods include, but are not limited to a sloping floor 119 or mechanical moving systems 117 such as augers or conveyors or a tilting mechanism such as a lifting device 129. Alternatively, an inlet moving device 123 for moving an inlet 127 of the vacuum device within the container 104 can be utilized. In another embodiment the outlet 112 can be connected to the inlet 115 using a connection such as a valve.

As shown in FIG. 7, the reel holders 120 can be adjustable in height and location either manually or mechanically 143, such as using a tread or locking rail system, to accommodate different size reels. Multiple reel holders 120 can be utilized so that multiple cables and/or innerducts/microducts 140 can be laid in the trench 11 simultaneously. The reel holders 120 can also have manual or mechanical/automatic winding systems 145 allowing the cable, innerduct/microduct 140 to be easily removed from the reels 121 and placed in the trench 11.

Any suitable micro trencher 2 can be utilized in the present invention. Non-limiting examples of suitable micro trenchers include those made and sold by Ditch Witch, Vermeer, and Marais. A micro trencher is a "small rock wheel" specially designed for work in rural or urban areas. The micro trencher 2 is fitted with a saw 10 that cuts a microtrench 11 with smaller dimensions than can be achieved with conventional trench digging equipment. Microtrench 11 widths usually range from about 6 mm to 130 mm (¼ to 5 inches) with a depth of 500 mm (20 inches) or less. Other widths and depths can be used as desired. For example, up to 30 inches deep can be used.

With a micro trencher 2, the structure of the road, sidewalk, driveway, or path is maintained and there is no associated damage to the road. Owing to the reduced trench size, the volume of waste material excavated is also reduced. Micro trenchers 2 are used to minimize traffic or pedestrian disturbance during cable laying. A micro trencher 2 can work on sidewalks or in narrow streets of cities, and can cut harder ground than a chain trencher, including cutting through for example but not limited to solid stone, concrete, and asphalt. The term ground as used herein includes, soil, asphalt, stone, concrete, grass, dirt, sand, brick, cobblestone, or any other material the trench 11 is cut into and the optical fiber buried within.

Figure 4:
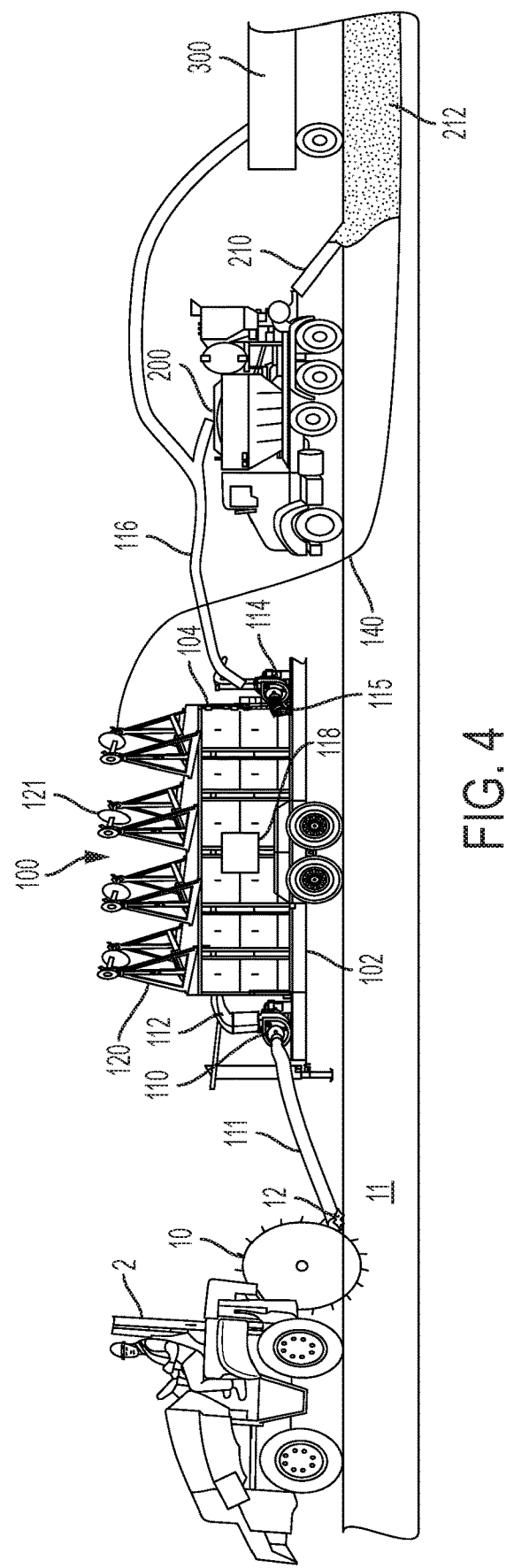
FIG. 4 illustrates a view of the multifunctional reel carrier, spoil material handling container device connected to a micro trencher and a fill device.
Figure 5:
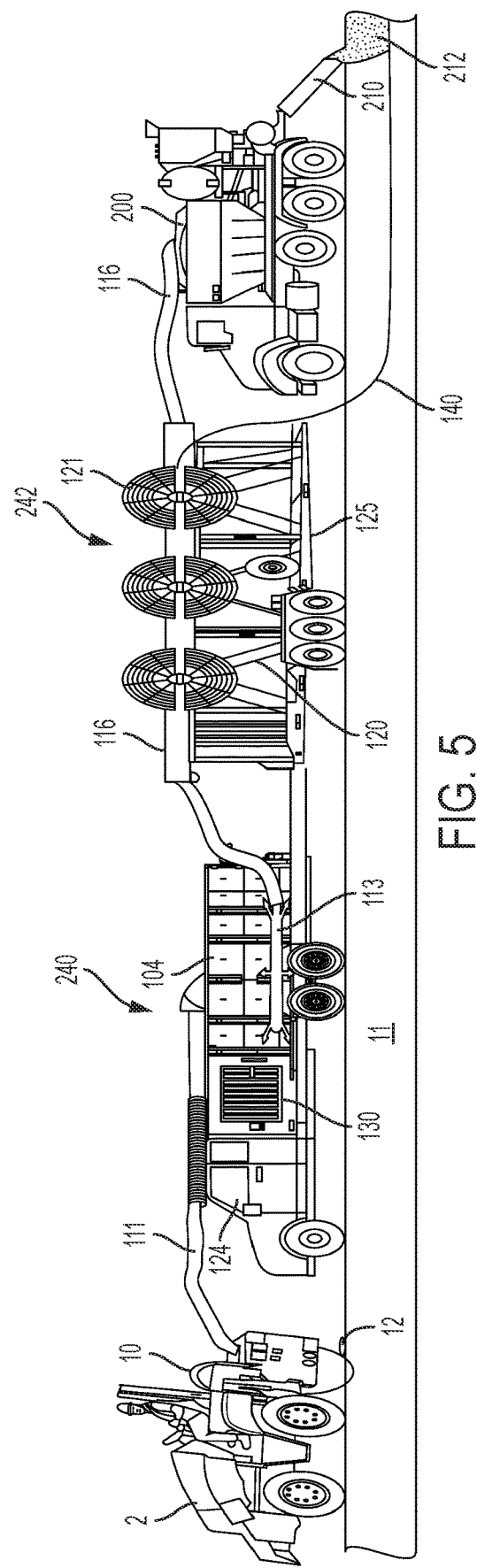
FIG. 5 illustrates a view of another embodiment of the multifunctional reel carrier, spoil material handling container device connected to a micro trencher and a fill device.
Figure 6A:
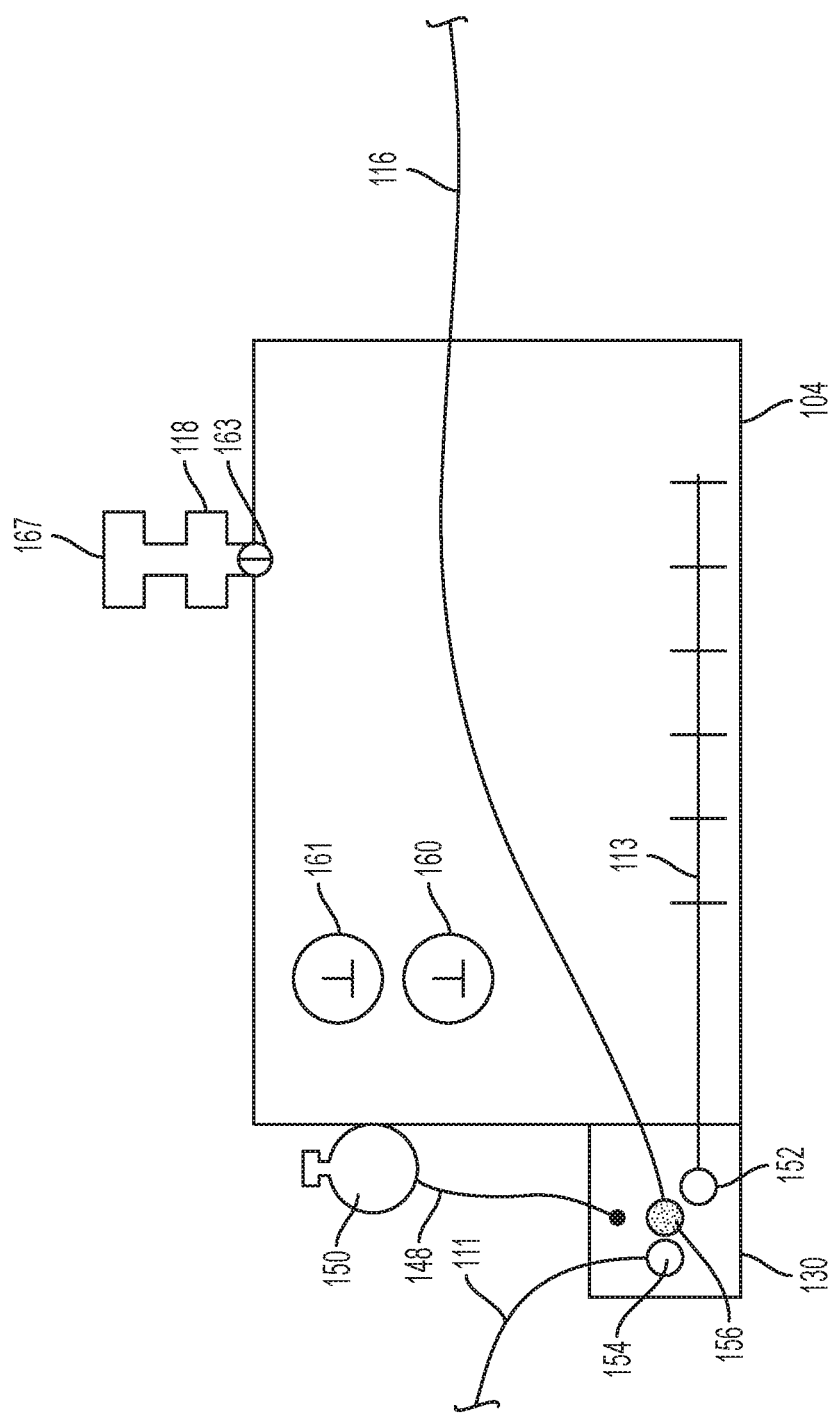
FIG. 6A illustrates a container device having an intake system.
Figure 6D:
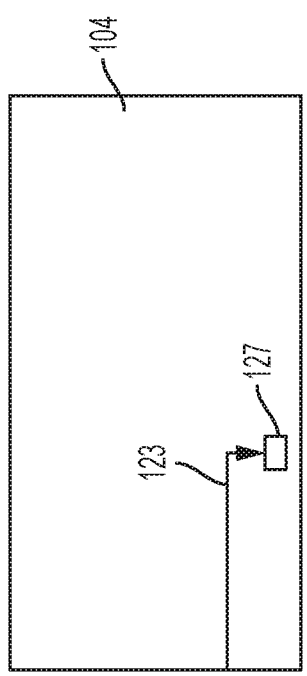
FIG. 6D illustrates a container device having a moving inlet device.
Figure 6E:
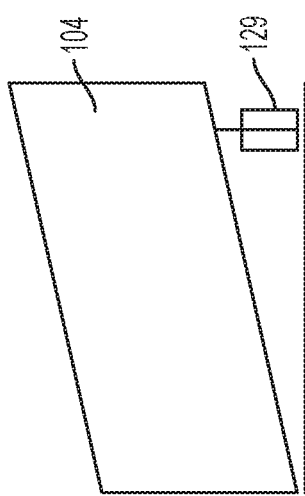
FIG. 6E illustrates a container device having a dump body.
Figure 8B:
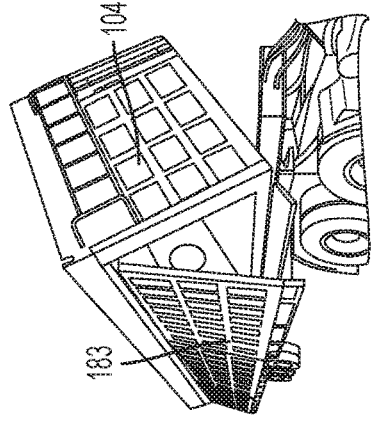
FIG. 8B illustrates an embodiment of the truck 124 showing how the container device can be dumped.
Figure 8E:
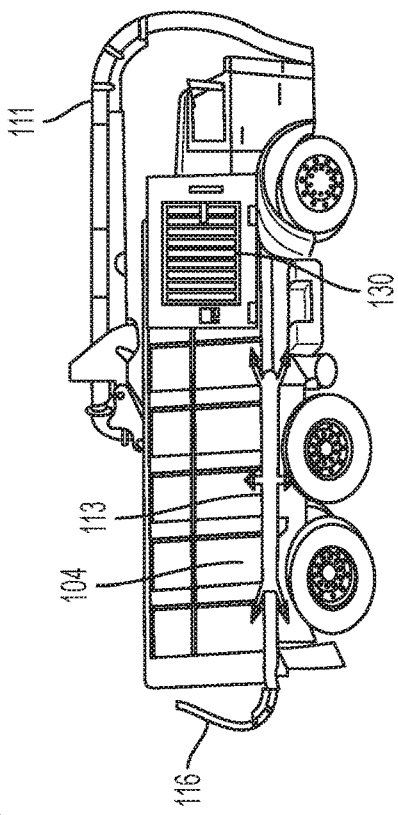
FIG. 8E illustrates an intake system for the container device
Figure 8C:
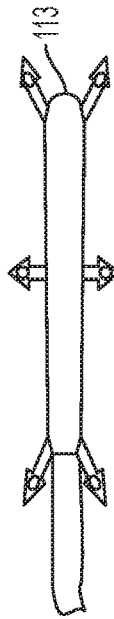
FIG. 8C illustrates an intake system for the container device.
Figure 8A:
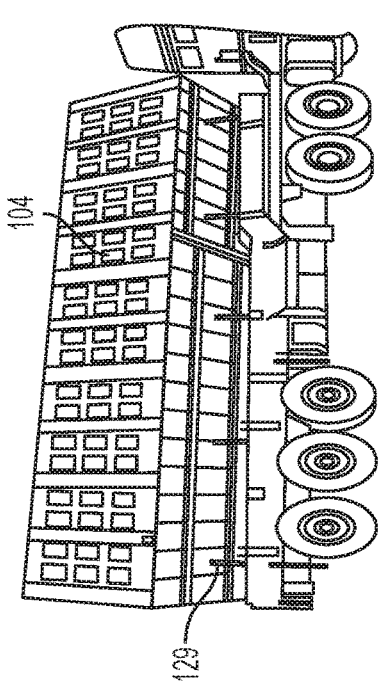
FIG. 8A illustrates an embodiment of the truck 124 showing how the container device can be dumped.
Figure 8D:
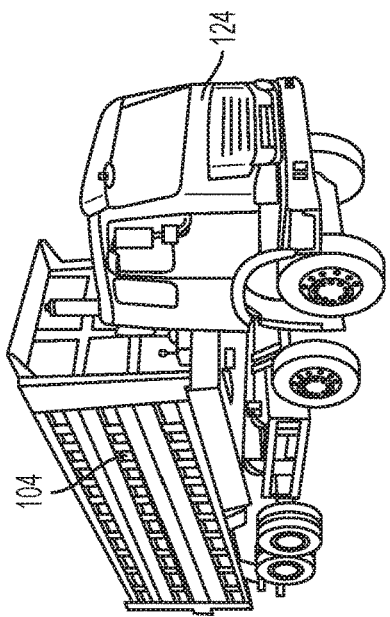
FIG. 8D illustrates an embodiment of the truck 124 showing how the container device can be dumped.
Figure 11A:
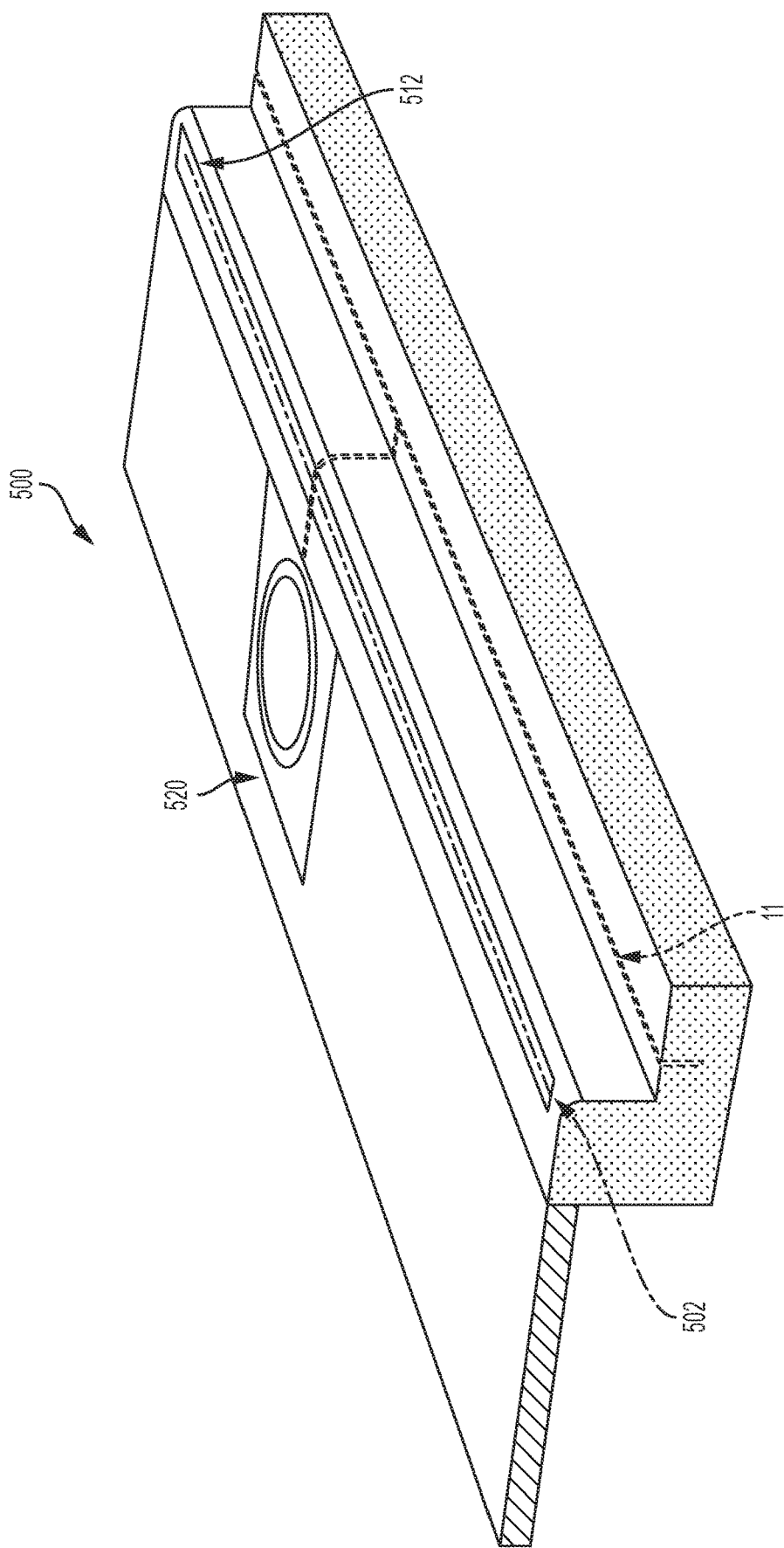
FIG. 11A illustrates a sidewalk and curb having a temporary optical fiber network and micro-trenches cut to move the temporary optical fiber network into a permanent position.
Figure 11B:
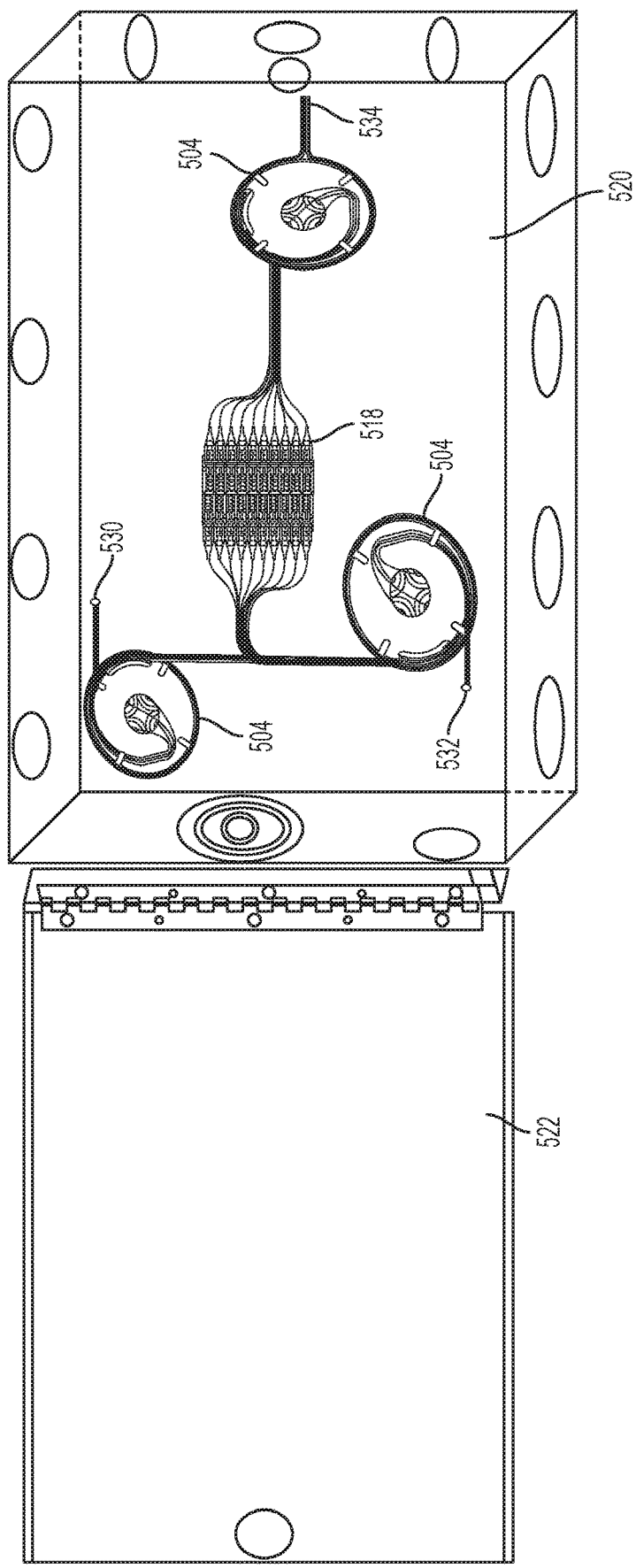
FIG. 11B illustrates a box having optical fiber that can be dispensed as needed.
Figure 11C:
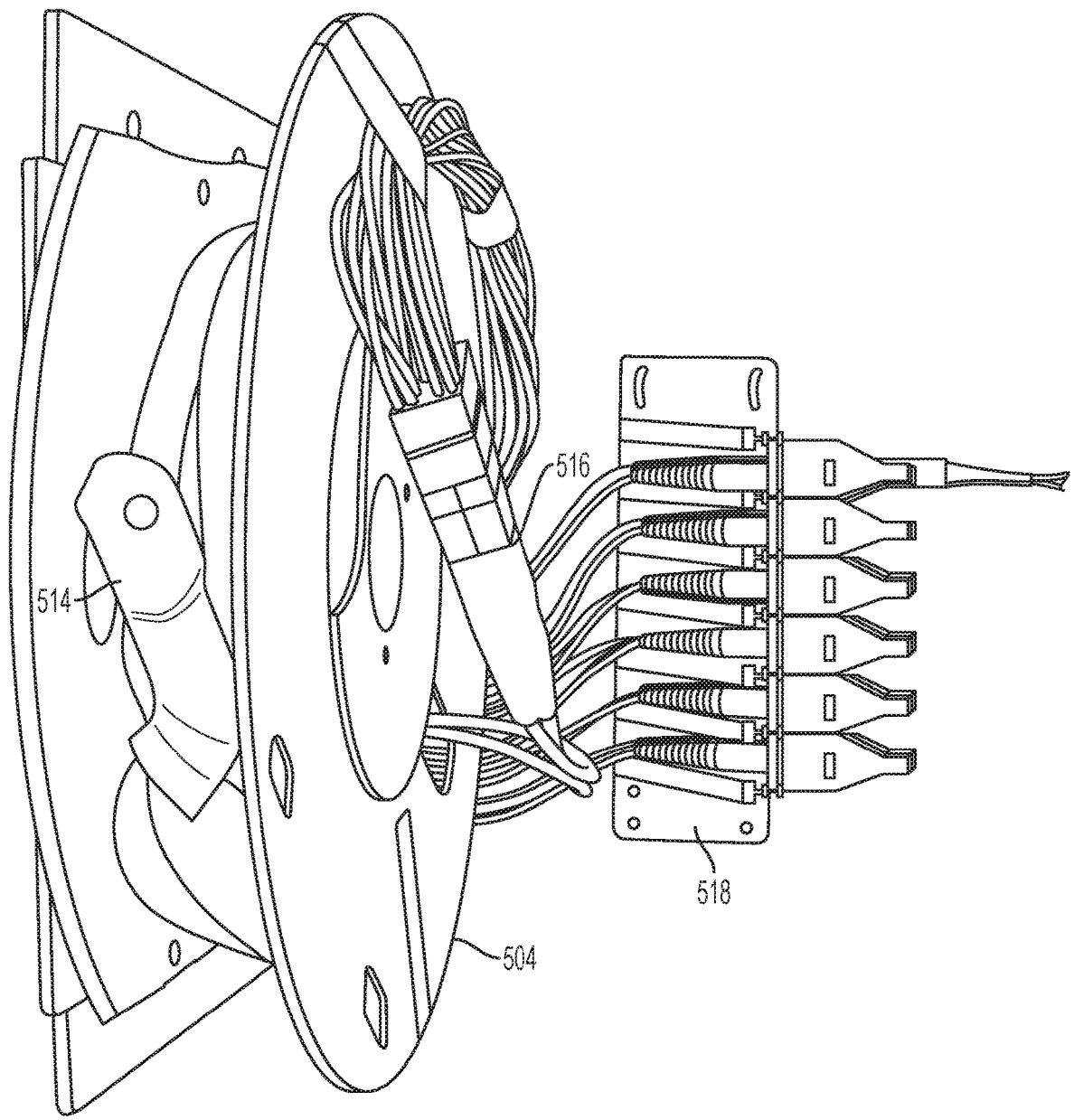
FIG. 11C illustrates a reel of optical fiber connected to a splitter.
Figure 11D:
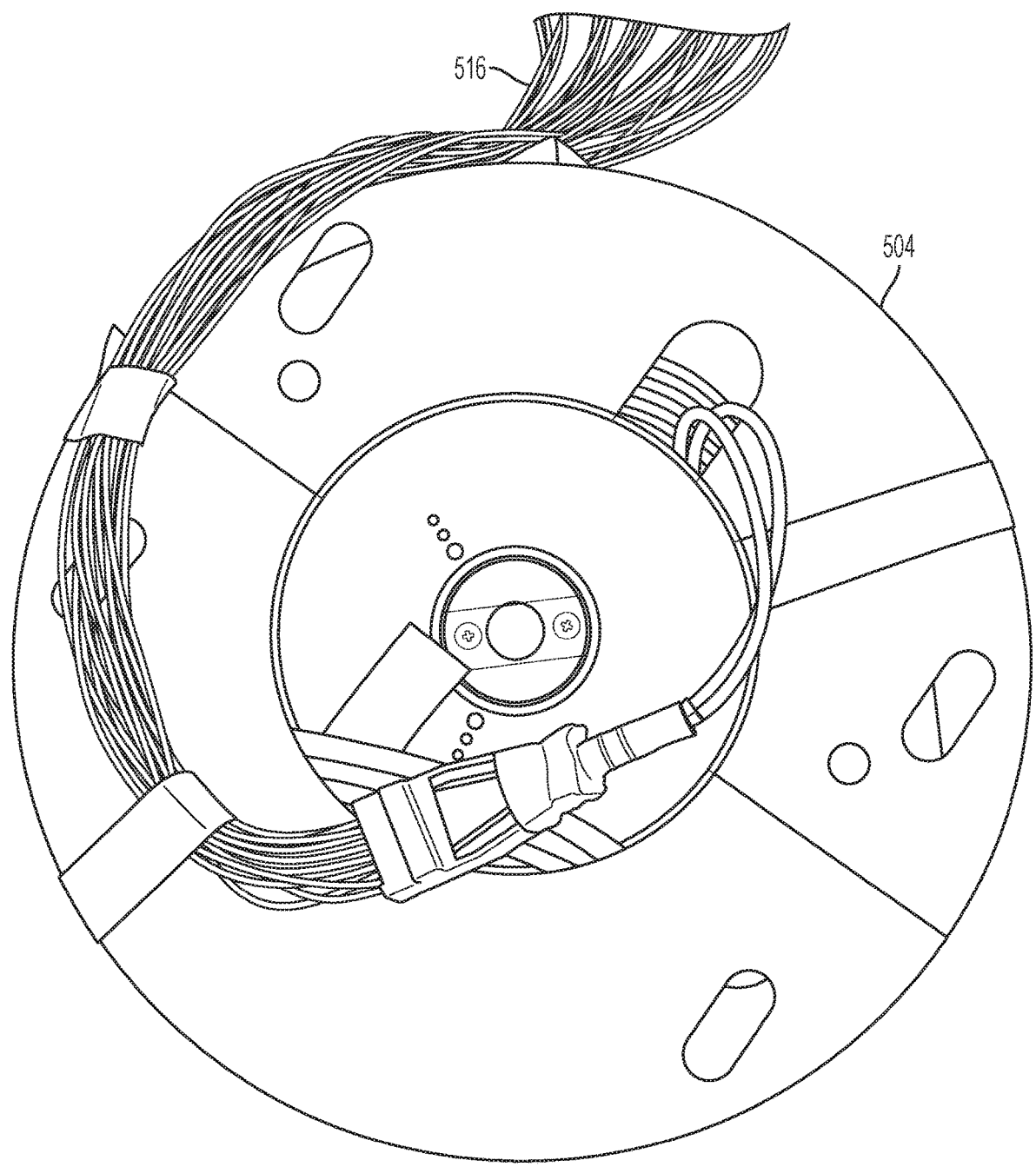
FIG. 11D illustrates a reel of optical fiber connected to a splitter.
Figure 11E:
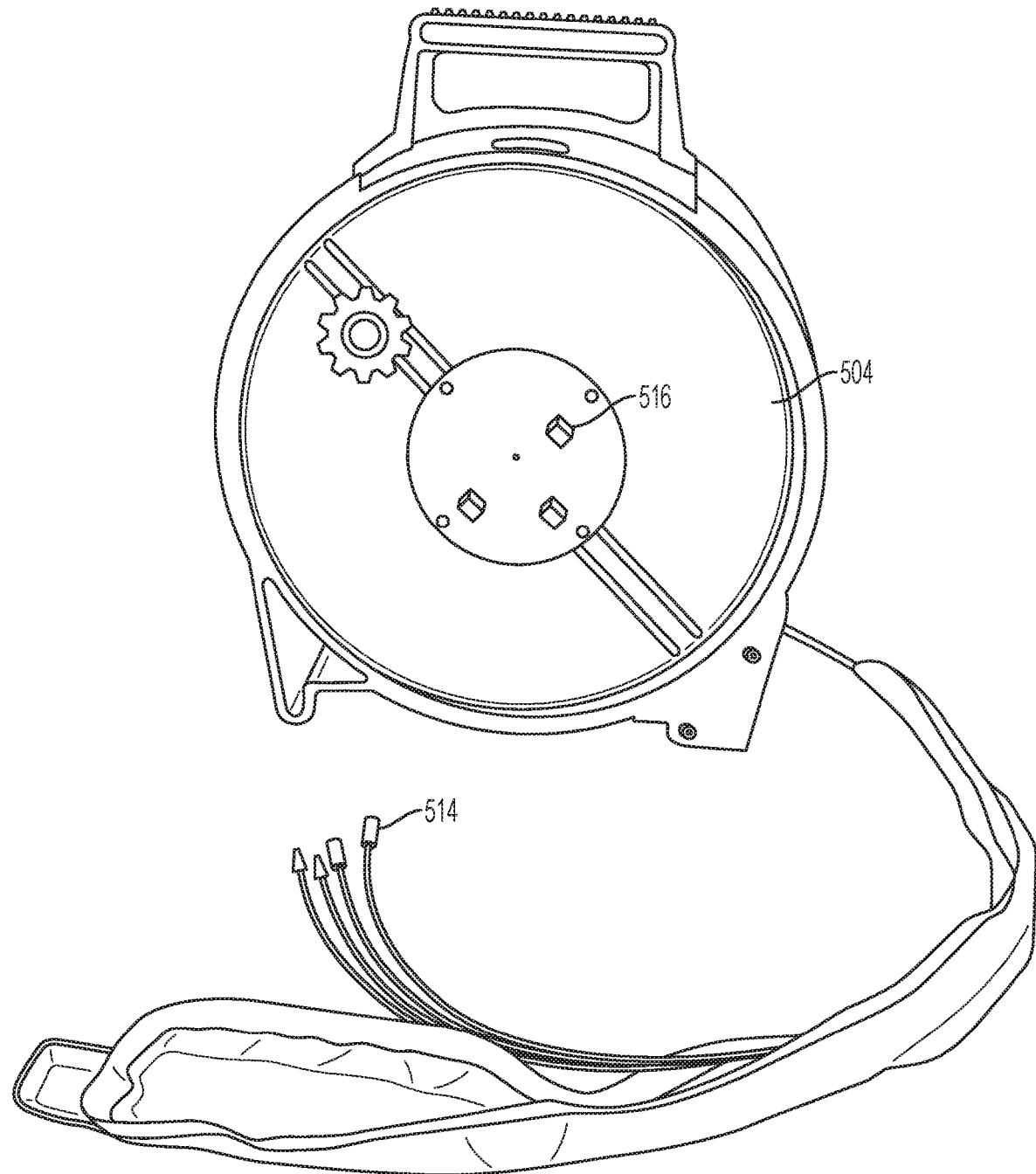
FIG. 11E illustrates a reel of optical fiber.
Figure 11F:
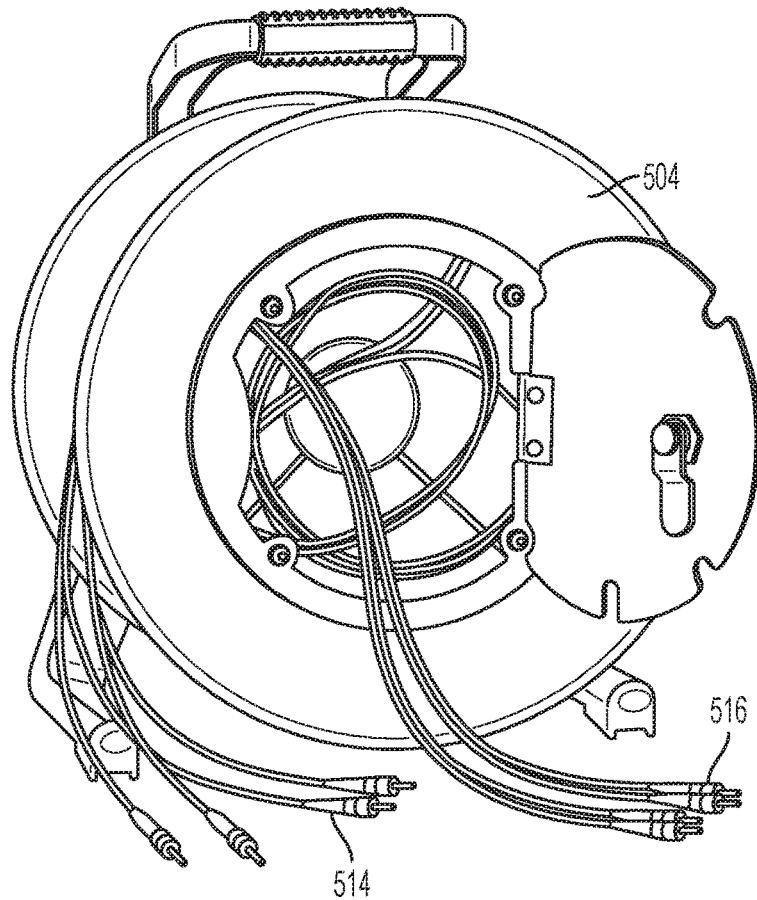
FIG. 11F illustrates a reel of optical fiber.
Figure 11G:
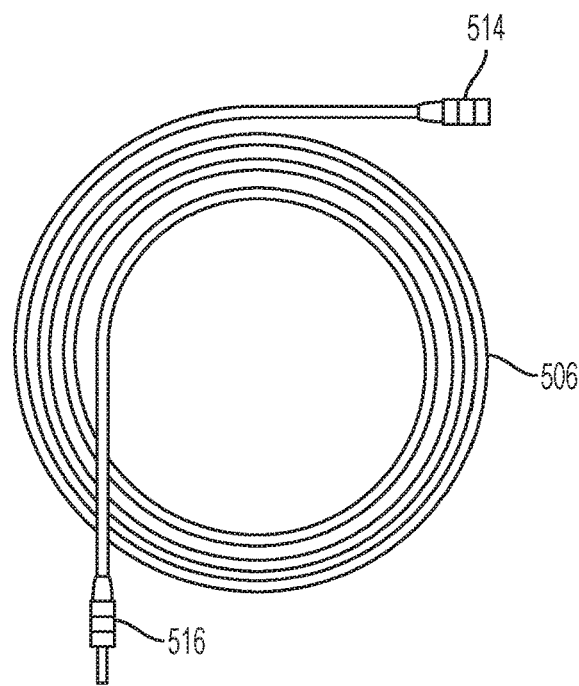
FIG. 11G illustrates a loose coil of optical fiber.

FIG. 5 shows another exemplary embodiment of the present invention. A micro trencher 2 is used to cut a micro trench 11. The multifunctional reel carrier, spoil material handling container device 100 is separated into a container carrier device 240 comprising a truck 124 and reel carrier device 242 comprising a trailer 125 so that the container carrier device 240 and reel carrier device 242 can be moved along with a micro trencher 2. The trailer 125 can be a separate truck if desired instead of a trader. The container carrier device 240 includes at least a first container 104 sized to hold spoil 12 created by the saw 10 cutting a microtrench 11. The first container 104 is constructed to hold the spoil 12. A vacuum device 130 has an inlet 111 disposed at the micro trencher 2 to suck up the spoil 12, and optionally to also remove spoil 12 from the microtrench 11. The inlet 111 comprises a hose. The inlet 111 can be connected to the container 104 and the vacuum device 130 connected to the container 104 so that when a vacuum is pulled on the container 104, the spoil 12 is sucked through the inlet 111 into the container 104. In this instance, the container 104 can be constructed to substantially maintain its shape when a vacuum is pulled. A safety valve can be present to prevent too much of a vacuum being pulled on the container 104. Alternatively, the inlet 111 can be connected to the vacuum device 130 and the spoil deposited into the container 104. The vacuum device 130 has an intake system 113 or inlet 127 inside the container 104 to suck up spoil 12 inside the container 104. An outlet 116 of the vacuum device 130 transfers the spoil 12 to the fill device 200 or to another vehicle 300 as shown in FIG. 4. Alternatively, the truck 124 can be fitted with two vacuum devices 110 and 114 as shown in FIG. 4 in place of the single vacuum device 130. Thus, the container carrier device 240 is constructed to move spoil 12 from the micro trencher 2 to the first container 104 and then to the fill device 200. The reel carrier device 242 comprises at least one reel holder 120.

As shown in FIGS. 6A-6E, the container 104 can be any desired shape, such as square, rectangular, or tubular and hold anywhere from 1 cu yard of spoil to 100 yds of spoil 12. The spoil intake, inlet 111, can be any desired location on the container 104, such as on the top, back, front or side of the container 104 or connected to the container 104 via the vacuum 110 or 130. Spoil removal intake system 113 or inlet 127 can be located in any desired position in the container 104, such as on the bottom, side, front or rear. The intake system 113 can have one large opening or multiple smaller openings spread out to remove the spoil 12 evenly from the container 104. The container 104 can have an opening and a lifting device 129, such as hydraulics, to lift or tilt the container 104 to move the spoil within the container 104 or to remove the spoil from the container. For example, the container 104 can be part of dump truck. Thus, the container 104 can have the ability to off load spoil 12 by tilting to either side to dump the spoil 12 through a door 183 or can be raised, expelling the spoil 12 from the rear. The side wall(s) and or back of the container 104 can be locked manually or hydraulically to ensure no spoil 12 or dust can leak out during the vacuum intake or outtake process. A fill gauge 160 can be installed showing how full the container 104 is. An air valve 163 can be installed to adjust the air pressure inside of the container 104, such as allowing air to be removed during and after operation when spoil 12 passes through the vacuum device and then into container 104 as shown in FIG. 4, or to allow air into the container 104 to prevent too low of a vacuum in the container 104 when the spoil 12 is sucked directly into the container as shown in FIG. 5. An air filter 167 can be installed allowing air to be released reducing pressure build up in the container 104 while containing dust inside of the container 104. Pressure gauge 161 can be installed to monitor the pressure in the container 104. The interior of the container 104 can have a stationary slant in the bed 119 or a mechanical bed 117 to help move the spoil 12 to a designated release point.

A conventional vacuum truck can be modified to remove spoil 12 from the container 104 by adding the intake system 113, adding an outlet 116 to fill device 200, and modifying the vacuum device 130 and/or adding an additional vacuum device to transfer spoil 12 from the saw 10 to the container 104 and to the fill device 200. FIGS. 8A-8E illustrate a modified vacuum dump truck 124.

The multifunctional reel carrier, spoil material handling container device 100 (FIG. 5) and the reel carrier 240 (FIG. 4) can each includes at least one reel holder 120 constructed to hold a reel 121 of cable or innerduct/microduct 140. The multifunctional reel carrier, spoil material handling container device 100 and the reel carrier 240 each preferably includes a plurality of reel holders 120 that can be adjusted in height 143 and moved manually or mechanically/hydraulically from front to back, back to front, side to side, or up and down. To reduce the overall height of the device, the reel holders 120 can be mounted on a separate trailer 125 that is towed by the truck 124.

The first vacuum device 110 and second vacuum device 114, and vacuum device 130 are constructed to suck up and expel the spoil. Commercial examples of suitable vacuum devices 110, 114, 130 are those made by SCAG Giant Vac., DR Power, and Billy Goat. The inlets 111, 115, 127 and outlets 112, 116 of the vacuum devices can be conventional hoses, such as 4 to 16 inch diameter hoses. The vacuum devices 110, 114 can also have a water misting system 148 that is attached to a water tank 150. The misting system 148 can be engaged manually or electronically programmed to emit a water mist inside the container 104 minimizing dust. The vacuum devices 110, 114, 130 can run on gas, diesel, electric or solar power. The vacuum devices 110, 114, 130 can have a steel impeller inside that will allow for any debris to be pulverized or chopped into smaller pieces. The vacuum devices 110, 114, 130 can be mounted on a truck or can be on a trailer and hitched to a vehicle for transportation. The vacuum devices 110, 114, 130 can be hooked up directly to a vehicle gas tank in order to eliminate a separate fueling mechanism. The vacuum fuel tank can have its own independent gas tank fueling mechanism. If one vacuum is used to do both intake and outtake, a secondary outtake valve 156 can be used for the spoil to be expelled. The intake valve 154 may need to be closed or shut off so no spoils will be expelled out of the saw connection. The intake system 113 can also have a valve 152 for controlling the amount of spoil 12 to be removed from the container 104. The vacuum can have a CFM (Cubic Feet per Minute) throttle allowing the intake and outtake speeds to be adjusted based on the operators requirements.

Figure 3:
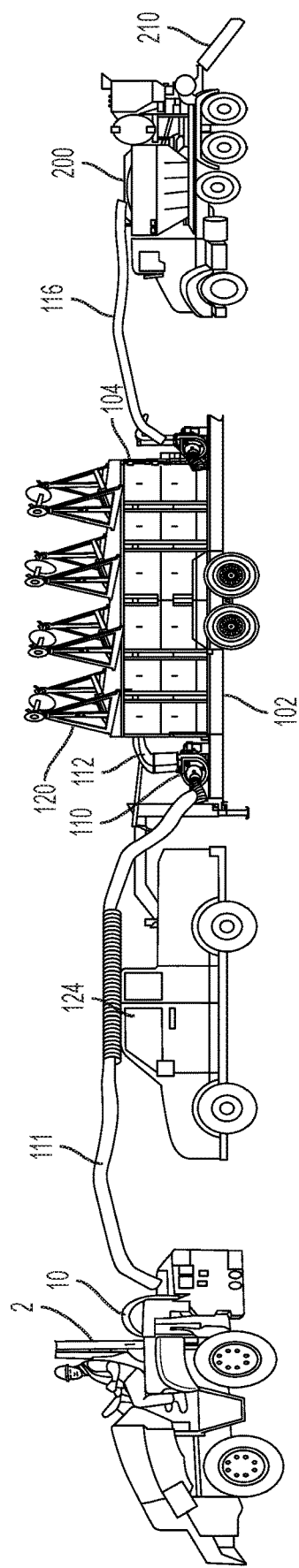
FIG. 3 illustrates a view of the multifunctional reel carrier, spoil material handling container device connected to a micro trencher and a fill device.

The present invention also relates to a continuous method of cutting a microtrench 11, laying cable and/or innerduct/microduct 140 in the microtrench 11, and then filling and sealing the microtrench 11 in one step (also referred to as one pass) with the fill 212. An exemplary method is shown in FIGS. 3 and 4. A micro trencher 2 is used to dig a trench 11 and create spoil 12. The first vacuum device 110 is used to vacuum the spoil 12 from the microtrencher 2, preferably also from the trench 11, and deposit the spoil 12 in the first container 104. Cable or innerduct/microduct 140 is spooled from the reel 121 and laid in the trench 11. A fill device 200 is then used to fill the trench 11 with fill 212 from an outlet 210 to cover the cable or innerduct/microduct 140. The second vacuum device 114 can be used to vacuum at least a portion of the spoil 12 from the first container 104 and transfer the spoil 12 to the fill device 200 to form the fill 212 from the spoil 12. The trench can be filled with one or more of the following examples, but not limited to, cement, grout, sand, self-leveling sealer, expansion joint, epoxy which is inserted into the trench on top of the cable or innerduct/microduct.

A further exemplary method is shown in FIG. 5. A micro trencher 2 is used to dig a trench 11 and create spoil 12. The vacuum device 130 is used to vacuum the spoil 12 from the micro trencher 2, preferably also from the trench 11, and deposit the spoil 12 in the first container 104. Cable or innerduct/microduct 140 is spooled from the reel 121 and laid in the trench 11. A fill device 200 is then used to fill the trench 11 with fill 212 from an outlet 210 to cover the cable or innerduct/microduct 140. The vacuum device 130 can be used to vacuum at least a portion of the spoil 12 from the first container 104 and transfer the spoil 12 to the fill device 200 to form the fill 212 from the spoil 12.

One or more spoil transport devices are utilized in the present invention to transfer spoil from the micro trencher 2, and optionally also the trench 11, and move the spoil 12 to first container 104, fill device 200, trucks, and/or any other devices utilized in the present invention. FIGS. 1-8 illustrate embodiments of the spoil transport devices comprising vacuum devices, as discussed above. Instead of vacuum devices, the spoil transport devices can be a conveyor 300, a screw 302, or any other spoil moving device as shown in FIGS. 9A and 9B. Preferably, the spoil transport device for removing spoil from the micro trencher 2 and trench 11 comprises a vacuum device.

A particularly preferred flowable concrete-based fill 212 can be formed by mixing together a bonding agent comprising a polymer additive (polymer bonding agent), concrete mixture (cement and aggregate) and a coloring agent to complete the micro trench or shallow trench backfilling operation. The spoil 12 can be used as part of the flowable concrete-based fill 212. A preferred commercial example of the polymer bonding agent is SC polymer by SureCrete, which can be found at https://www.surecretedesign.com/product/liquid-concrete-polymer/. Examples of the polymer bonding agent include latex modified bonding agents, acrylics, epoxies, styrene-acrylics, vinyl acetate ethylene (VAE), polyvinyl acetate (PVA), and styrene-butadiene resins (SBR). In liquid form, polymer bonding can be supplied in two parts, liquid and powder, to be mixed together prior to use. In dry form, the polymer bonding agent can be pre-packaged with desired materials blended for specific applications. A preferred polymer bonding agent is an acrylic polymer. The polymer bonding agent can be added to the flowable concrete-based fill 212 in conjunction with substituting sand and/or spoil for conventional gravel aggregate to allow for use in the micro trench or shallow narrow trench application. By altering the slump or viscosity of the concrete by altering the water content we were able to control the flow rate and application of the mixture into the narrow trench. There are other commercially available bonding agents that will perform similar the product above. Polymer bonding agents for concrete are well-known in the art and any desired polymer bonding agent can be utilized to increase the bond between the set fill and the roadway in the microtrench.

One of ordinary skill in the art will be able to adjust the viscosity of the bonding agent/concrete mixture fill 212 so that the fill 212 can flow into the shallow narrow trench, such as less than 2" in width and from 2" to 20" in depth.

In comparison, previous to the present polymer bonding agent/concrete mixture, we used concrete mixtures or asphalt mixtures as the primary backfill in the trench and then a chemical compound was utilized over top of the mixture to seal the roadway from water intrusion. By using the concrete with the bonding agent in the trench we have eliminated the need for multiple passes as the bonding agent will bond to the trench and provide the necessary seal to the roadway. The chemical compounds utilized previously in sealing the trenches are costly, slow to deploy in some cases, and was required installation crews to complete multiple steps in completing an operation. Furthermore, by coloring the bonding agent/concrete mixture to match the roadway color we have further reduced the cost of installation by completing the backfill in one step and the coloring is similar to that of an existing roadway. The bonding agent provided the adhesion to the existing surface which in the past was completed with different much more expensive chemicals. The bonding agent/concrete mixture allows for the installation of a cement based product with adhesive characteristics. Filling a microtrench in one step using a color matched bonding agent/concrete mixture instead of multiple steps has not been done heretofore.

By pumping or using commercially available concrete installation tools, substituting sand and/or spoil for conventional stone aggregate, regulating the viscosity of the concrete product by adjusting the water content, adding the coloring agent to the concrete, and adding a bonding agent, we have developed a method of completing the shallow narrow trench that is far faster and significantly more cost effective than prior solutions that are utilized in the industry. This allows for significant cost savings compared to other methods of backfilling a shallow narrow trench.

The figures show exemplary devices for practicing the claimed invention that are now being used by the inventor to install optical fiber cable for Google. The present invention allows surprisingly far faster and more efficient installation of the optical fiber. For example, our multiple crews installing optical fiber cable for Google are installing from 4000 to 6000 feet of optical fiber cable per day. We believe up to 7000 feet per day can be achieved. Conventional methods only allow about 1000 feet per day. The present invention causes far less disruption of roads and pathways. The present invention can also return the roads and pathways to their original state with the same colored fill. The present invention is not limited to the order of the devices and methods illustrated in the figures and any desired order of devices and steps can be utilized to practice the claimed invention.

In another embodiment, a marker line 400 as shown in FIG. 10 can be applied to the surface 402 of the ground to be cut by the micro trencher. In this manner, utilities can see where the micro trench 11 will be formed so that the utilities can mark locations of their infrastructure 410, such as electrical lines, optical cable, water lines, sewer lines, or any other infrastructure. The marker line 400 can have start 406 and stop 408 locations, and can identify the depth. The marker line 400 can be a solid line, dashed, dotted, contain letters, numbers or symbols, and can be any desired color with white being the most preferred.

In another embodiment of the invention, a temporary fiber optic cable network can be laid out on the surface and utilized as a temporary optical fiber network. The temporary optical fiber network can be protected with any desired protection device, such as conduit, tarps, tape or other type of cover, that can be skid proof, and constructed for outdoor use which can withstand foot and vehicle traffic. For example, the tape can be heated to activate an adhesive, or peelstick, silicone, epoxy glue or any desired type of adhesive. The surface can be a street, sidewalk, driveway, asphalt, concrete, dirt, interior floor, or any other desired surface.

As shown in FIGS. 11A-11G, the temporary optical fiber network 500 includes at least one optical fiber cable 502, and preferably a plurality of optical fiber cables 502. The optical fiber cables 502 can be coiled on a reel 504 or loosely coiled 506. Each end of the optical fiber cables 502 can have a first connector 514 installed thereon, or a connector can be installed in the field by a technician. The optical fiber cable 502 can be uncoiled to a desired distance and a protection device 512, such as tape, applied thereover. A first end of the optical fiber cable 502 can be connected to a desired feed using the first connector 514. The second end of the coil can be connected to any desired location using the second connector 516. The connectors 514, 516 can be connected to splitters 518 or any desired device. The desired location can be dwelling, sporting event, military site, or any other desired location.

The reel 504 and loose coil 506 allows the fiber cable 502 to be deployed to any desired length and also to be recoiled if necessary. The second end connector 516 can be constructed so that the second end connector 516 can remain connected while the reel 504 is rotated, similar in design to the Camplex reels. Alternatively, the second end connector 516 can be disconnected while the reel 504 is rotated so that the connector 516 can rotate with the reel 504. The loose coil 506 or wound reel 504 can be installed within a box 520. The box 520 can contain multiple reels 504 or coils 506. The box 520 can be formed from plastic, metal, galvanized, stainless steel, concrete, fiberglass, rubber or any other suitable material. The reels 504 can be mounted on bracket(s) or rod(s) 522 that can be placed from side to side (horizontal) or from bottom to top (vertical). Spacers can be placed in between the reels so they can spin independently of each other. The box 520 can have any desired shape, such as tubular, square, triangular, rectangular or any other desired shape. The box 520 can have a lid or door that can be locked or otherwise secured. The box 520 can be mounted on a roller. The box 520 can be buried, mounted pole, or secured in any desired location.

The box 520 can have one or more optical fiber extenders, such as reels 504 or loose coils 506, for input 534 to allow optical fiber cable 502 to be unwound for a temporary or final installation. The box 520 can have one or more optical fiber extenders, such as reels 504 or loose coils 506, for output 532 to allow optical fiber cable 502 to be unwound for a connection(s) to and additional box(es) 520 for temporary or final installation. The box 520 can have one or more optical fiber extenders, such as reels 504 or coils 506, for fiber drops 530 to allow optical fiber cable 502 to be unwound for connections to customers for temporary or final installation.

After using the temporary optical fiber network 500, once the desired location of the optical fiber 502 and box(s) 520 are known, the optical fiber network can be made permanent by removing the protection device 512, creating slack in the optical fiber 502 by uncoiling the optical fiber from the extenders in the box 520, creating a microtrench as described herein, burying the optical fiber and covering the optical fiber with a fill, and permanently mounting or burying the box(s) 520.

Fiber optic converter/extenders on a 1000 foot reel are known. Commercial examples are cmx-tacngo-sdi tac-n-go 3G sdi fiber optic converter/extender, TAC1 Simplex LC fiber optic tactical cable reel, and Tac-N-Go fiber optic by Camplex. www.camplex.com. These are field deployable optical fiber reel systems. Corning systems also provides fiber optic convert/extenders at any desired length, any number of connectors, such as 1 strand to 864 strands, usually from 6 strands to 432 strands, and the fiber optic cables can be connectorized in field or already have a connector applied. The known reels can be utilized in the present box 520 and permanently mounted.

The temporary taped optical fiber installation can be utilized to provide an optical fiber network 500 to a desired user, such as a neighborhood, business, sporting event, military complex, or any other desired location. Once the desired location of the optical fiber is determined, slack can be provided in the optical fiber 502, the tape 512 removed, a nanotrench or microtrench 11 can be formed, the optical fiber 502 installed in the microtrench 11, and then the microtrench 11 can be filled 212 using any desired method, such as the methods described herein above. Instead of the microtrench 11, the optical fiber can be mounted in conduits, drills, core drill, hung, walls, hydrovac, and/or directional drill. If the optical fiber 502 is on a reel 504 within the box 520, the box 520 and reel 504 can be permanently mounted. In addition to the fill 212 described above, the buried fiber cable 502 can be covered with self leveling grout, caulking, asphalt, tar, SL1, cold patch, concrete, sterling Loyd, of other fill products.

The fill 212 can be covered with a spray on waterproofing sealer. A preferred example is the TRANSLINE SOLVENT-BASED SOLID COLOR WATERPROOFING SEALER AND TREATMENT—BLACK developed as a modification to the Black Gorilla Paint, 22A-E001, to help with spraying the material easier. The TRANSLINE SOLVENT-BASED SOLID COLOR WATERPROOFING SEALER AND TREATMENT—BLACK can be changed to the same formula as the Black Gorilla Paint, 22A-E001. Alternatively, the Black Gorilla paint can be utilized.

The present invention includes a system, method and device for connecting a fiber optic cable 502, by the second connector 516, to a feeder line that supplies one or more signal types, such as television (TV), data (e.g., internet access), and telephone (fixed wireline or cellular), to a plurality of units (offices or dwellings) in a multi-unit building. In some example embodiments, the system, method and device may be used to connect a fiber optic cable 502 to existing internal wiring (twisted pair, coaxial cable, etc.). In addition or alternatively, the device can be used to connect a feeder line to a wifi, local network, telephone network, or any other desired connection within the building. The invention can also be used to supply a neighborhood. For example, if coax is already connected to an existing neighborhood, the coax can be connected to cards in a box and an optical fiber cable 502 can used to input a feeder line into the input 534 of the box 520 so that coax does not have to be replaced saving considerable time and expense. In this manner the box can be placed on a telephone pole or near an optical fiber connection so that and optical fiber cable 502 input can be connected to the multiple existing coax cables.

Specifically, in many buildings it may be cost prohibitive and/or impractical to run fiber optical fiber cable 502 to each unit. In addition, the various owners of units may want to purchase services that require different drop connections (i.e., the wiring (twisted pair, fiber, coax, etc.) that connects the unit to the feeder line using optical fiber cable 502. In addition, it may be more economical to use an existing drop connection (e.g., twisted pair) for some services (e.g., telephone). For example, one dwelling unit may purchase only telephone service (which may employ a twisted pair drop connection), another dwelling unit may purchase telephone and television service (which may employ a coaxial cable or coax cable and twisted pair drop connection), and yet another dwelling unit may purchase only internet access (which may employ a fiber conductor or coaxial cable drop connection). Embodiments of the present invention may be used to service buildings to supply service to units using any of various media including twisted pair, coaxial cable, fiber optics, CAT-5 (Ethernet), and/or others. The disclosure in my previous U.S. Pat. No. 9,485,468 is incorporated herein by reference.

While the device for cutting a microtrench device is preferably utilized to bury the temporary optical fiber network, any trenching device can be utilized. For example, the trench can be ⅛ inch to 1.5 inch wide and up to 6 inches deep when using the microtrenched, or 0.75 to 3 inches wide, and as deep as 24 inches for larger trenching devices.

Figure 13:
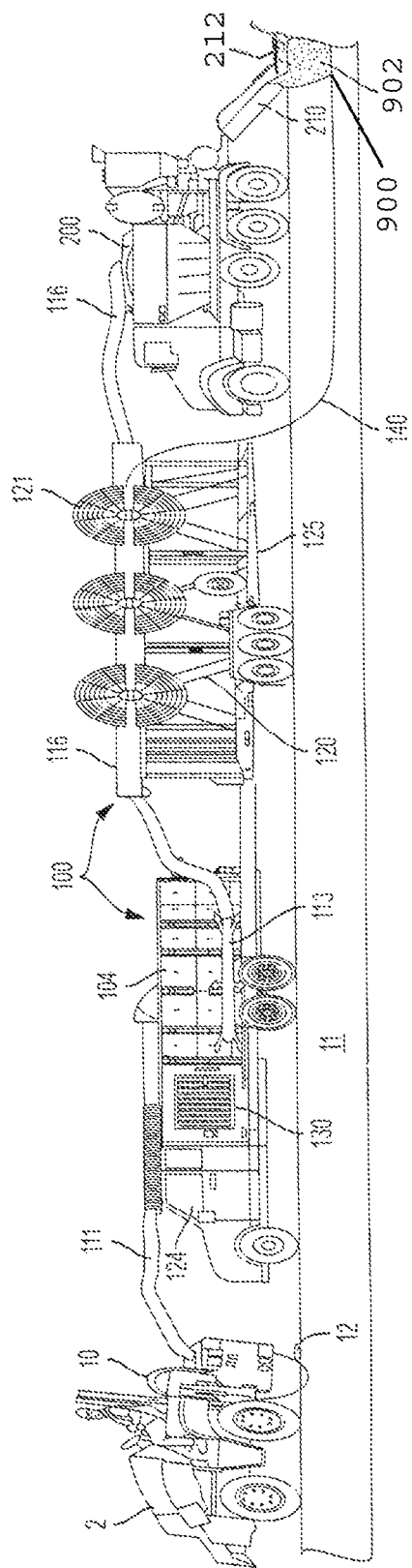
FIG. 13 illustrates a device for applying the device identifier fill.

As shown in FIGS. 12 and 13, the device identifier fill 902 below the surface can comprise any desired fill material, for example, but not limited to dirt, spoil, sand, concrete, or flowable fill that has been colored, so that one or more specific color(s) identifies that a device 900 is buried below the device identifier fill 902. The color(s) of the device identifier fill 902 can also identify the specific type of buried device 900. For example, the device identifier fill 902 can be tinted, dyed, or painted to any color(s) to signify the location and/or type of buried device(s) 900. For example, a first color for electrical, a second color for water conduit, a third color for sewer conduit, a fourth color for cable, a fifth color for gas, a sixth color for telecommunication devices, and additional colors can be used to identify combinations of these buried devices 900 and/or other buried devices 900. The communications devices can include any of optical fibers, connectors, amplifiers, and any device utilized in communications, including but not limited to television, radio, voice, and internet. The buried devices 900 includes the multiple cables and/or innerducts/microducts 140. Orange or yellow is preferred for buried telecommunication equipment and cables. Thus, when workers are digging, if they see the device identifier fill 902 in the ground or on the digging device they can stop digging to avoid damaging the buried device(s) 900. The device identifier fill 902 can be used in any application and is not limited to microtrenching. In this instance, the device identifier fill 902 can be the fill 212, dirt or any material to which a coloring agent can be added and then used to cover the buried device. The device identifier fill 902 can be used during burying any device 900 to identify the location and/or type of the buried device 900. In addition, when microtrenching, the surface of the trench can be filled with the fill 212 or surface coating having a color to substantially match the surface, such as black for asphalt and white for cement, the below ground device identifier fill 902 can be utilized to identify the type and/or location of the buried device(s) 902. Preferably, the coloring agent is non-toxic, environmentally friendly, and will not contaminate ground water. Coloring agents, from paints and dyes, are now well known and any suitable coloring agent can be utilized in the device identifier fill 902. A preferred coloring agent (colorant) is a powdered concrete dye, such as those sold commercially from Quickrete, Stone Technologies, or DCI.

When utilizing the device identifier fill 902 in the microtrenching, the fill device 200 can fill the trench with the device identifier fill 902 and then simply spray or apply a coating or top surface of fill 212 over the device identifier fill 902. FIG. 13 illustrates the fill device 200 applying the device identifier fill 902 first in the microtrench 11 above the cable and/or innerduct/microduct 140, and then applying the colored fill 212 to match the surface. Alternatively, a coating can be sprayed or applied over the device identifier fill 902 and/or over the fill 212.

The device identifier fill 902 can be any desired thickness above the buried device 900. Preferably, the device identifier fill 902 fills most of the trench to provide a warning to construction workers digging over the buried device 900. Examples of suitable thickness are from 1 to 36 inches, preferably from 1 to 24 inches.

In addition to or in place of color, the device identifier fill 902 can incorporate other means to provide location and/or identification of the buried device 200.

Google has been aggressively attempting to copy the present fill 212 having cement, polymer bonding agent, and coloring agent that can continuously fill and seal the microtrench 11 in a single continuous step to provide a sealed microtrench 11 that substantially matches the color of the roadway in one pass. Google has tried numerous concrete type materials, such as Fast Patch which a well-known concrete crack repair product. However, the fill material based on Fast Patch oozed out of the microtrench and did not adequately seal the microtrench. Google also tried numerous tar based sealants, such as Craftco, to try and seal a microtrench. However, in one example, an inspector for the city of San Antonio was able to easily peel the Craftco tar fill from the microtrench like peeling tape. Conventional cement crack repair products are not known for successfully filling and sealing a microtrench. It is not obvious to use common crack repair and polymer containing materials to fill a microtrench in a roadway. The present invention required significant research and testing to discover a fill 212 that exhibits a fast final set (2 hours or less), high adhesion characteristics, low permeability, and a high density to provide a sealed microtrench that will not fail under exposure to the environment and vehicle traffic.

Concrete usually has a final set within 24-48 hours. Initial and final set times as used herein are measured at 72° F. (22° C.) ASTM C 191 for hydraulic cement. The fill 212 is similar to hydraulic cement in that it is similar to mortar and must prevent water infiltration into the sealed microtrench 11. The initial set time is calculated as the time elapsed between the initial contact of cement and water and the time when the needle penetration into the cured fill is at 25 mm. The final set time is calculated as the time elapsed between the initial contact of cement and water and when the needle does not sink visibly into the cured fill. In the present invention, where microtrenching is continuous, laying the optical fiber in the microtrench 11 is continuous, and then filling/sealing the microtrench 11 with the fill 212 is a continuous single step, the fill 212 has a final set time of less than 2 hours, preferably less than 1 hour, and more preferably in about 30-40 minutes. The final set time of the fill 212 can be adjusted by using faster cements, such as calcium sulfoaluminate cement, and/or by using a cement accelerator. The fill 212 exhibits a compression strength sufficient for vehicular traffic to pass over the microtrench 11 without damaging the cured fill in the microtrench 11 in a far shorter time period than prior art methods of filling a microtrench.

Examples of cement accelerators include calcium nitrate ($Ca(NO_3)_2$), calcium formate ($Ca(HCOO)_2$), sodium nitrate ($NaNO_3$), calcium chloride ($CaCl_2$)) and calcium sulfoaluminate cement. Further examples include salts of nitrate (for setting), thiocyanate (for hardening), triethanolamines, alkanolamines, carboxylic acids, sulphates, and aluminum sulphate. The accelerator can be added in an amount to provide a desired fill curing rate in the microtrench, such as a final set time of 6 hours or less, preferably 4 hours or less, and most preferably 2 hours or less.

Conventional fill devices 200, as shown if FIGS. 3 and 4, typically have multiple containers, such as dry containers that can be used for storing the cement, powdered dye, cement accelerator, aggregate, and any other dry materials, and liquid containers that can be used for storing water, liquid bonding agent, and any other liquids. The conventional fill devices 200 also can contain a mixed fill container which holds the formed flowable concrete-based fill material 212, proportioning systems for selecting amounts of dry materials and liquids to combine, mixing devices for mixing the dry materials and liquids, and delivery mechanisms for delivering the formed flowable concrete-based fill material 212 to the microtrench 11. Commercial examples of conventional fill devices 200 include the volumetric concrete mixers sold by Cemen Tech, such as the M and C series trucks, shown at www.cementech.com. Thus, using the conventional fill device 200, the cement, cement accelerator, aggregate, bonding agent, colorant, and water can be stored, mixed as desired, and then applied to the microtrench in less than 2 hours after mixing, preferably less than 1 hour after mixing, and most preferably the fill material 212 is formed and applied to the microtrench 11 in real time. In this manner, the steps of filling, sealing and coloring the microtrench can be conducted in one step continuously as discussed herein, without requiring multiples passes over the microtrench 11. The fill device 200 can follow behind the microtrencher 2 as shown in FIGS. 3-5 to provide a method of continuously cutting the microtrench 11, laying the optical fiber and/or innerduct/microduct in the microtrench 11, and filling the microtrench 11 with the flowable concrete-based fill 212 in one pass, without having to conduct multiple passes.

A preferred fill 212 for use in the present invention is formed by mixing together a polymer bonding agent, portland cement, calcium sulfoaluminate cement, a colorant, aggregate, and water. The fill 212 ingredients can be mixed in a conventional fill device 200 just before simultaneously filling and sealing the microtrench in one step, to provide a sealed microtrench having a color substantially the same as the roadway to put the roadway substantially back to an original state before cutting the microtrench A particularly preferred flowable concrete-based fill 212 can be formed by mixing together the bonding agent SC polymer, Fastrack 400 portland cement from Western Material & Design (mixture of Portland cement and calcium sulfoaluminate cement), LLC, a concrete dye, aggregate and water. The water is added in a sufficient amount to provide a desired viscosity and flow rate from the fill device 212 to fill and seal the entire microtrench 11 in one pass. This preferred fill 212 exhibited minimal shrinkage (0.020% after 28 days using ASTM C157, air cure), which is far less than conventional cement/sand mixtures. Reduced shrinkage provides a better bond to the microtrench 11 and also an even surface with the surrounding roadway. Using ASTM C39, the fill 212 exhibited a compressive strength after 2 hours 3,500 psi (24.1 MPa); 3 hours 4,300 psi (29.6 MPa); 1 day 5,740 psi (48.3 MPa); 7 days 6,680 psi (48.3 MPa); and 28 days 7,260 psi (55.2 MPa). Thus, the fill 212 exhibited a compression strength sufficient for vehicular traffic to pass over the microtrench 11 without damaging the cured fill in the microtrench 11 in a far shorter time period than prior art methods of filling a microtrench. Conventional cement/sand formulations have a substantially lower compressive strength. The bonding agent provided a sufficient bond to the sides of the road in the microtrench 11 to prevent water penetration into the sealed microtrench 11, so that the sealed microtrench 11 will not be adversely affected during freezing and thawing throughout the seasons.

The cement, cement accelerator, polymer bonding agent, colorant, and aggregate can be added in the amounts necessary to provide the required properties to fill and seal the microtrench 11 for vehicular use and exposure to the environment, and provide a final set time of 2 hours or less, as discussed above. Exemplary amounts include, based on weight % of the entire fill 212, when a cement accelerator is utilized:

1-80% cement accelerator;
1-80% cement;
0.01-5% colorant;
0.01-20% polymer bonding agent;
1-80% aggregate; and
10-80% water in an amount to provide flowable fill.

When a faster setting cement, such as calcium sulfoaluminate cement, is utilized, exemplary amounts include, based on weight % of the entire fill 212, when a cement accelerator is utilized:

0-80% cement accelerator;
1-80% cement;
0.01-5% colorant;
0.01-20% polymer bonding agent;
1-80% aggregate; and
10-80% water in an amount to provide flowable fill.

When burying telecommunications cable, such as optical fiber, additional protection can be added such steel plate above the cable and or a steel conduit around the cable.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

The invention claimed is:

1. A method of continuously filling and sealing a microtrench containing an optical fiber and/or innerduct/microduct on a roadway to return the roadway to substantially an original state with a color-matched, filled and sealed microtrench comprising:

forming a flowable concrete-based fill in a fill device by mixing together a cement, a polymer bonding agent, a colorant, an aggregate, and water, wherein the colorant provides the flowable concrete-based fill with a color substantially matching the color of the roadway, the polymer bonding agent provides adhesion to the existing roadway to seal the microtrench against water infiltration, and a cement accelerator and/or calcium sulfoaluminate cement in an amount to provide the flowable concrete-based fill with a final set time of 1 hour or less, and the flowable concrete-based fill is configured to flow into the microtrench from the fill device; and continuously filling the microtrench with the flowable concrete-based fill material from the fill device to cover the optical fiber and/or innerduct/microduct, fill and seal the microtrench and return the roadway substantially back to the original state with the color-matched, filled and sealed microtrench.

2. The method according to claim 1, further comprising forming the flowable concrete-based fill in real time and filling the microtrench by the fill device in real time.

3. The method according to claim 1, further comprising mixing the cement accelerator into the flowable concrete-based fill in an amount to provide the flowable concrete-based fill with the final set time of less than 1 hour.

4. The method according to claim 1, wherein the cement comprises the calcium sulfoaluminate cement in an amount to provide the flowable concrete-based fill with the final set time of less than 1 hour.

5. The method according to claim 1, further comprising forming the flowable concrete-based fill so that the flowable concreted-based fill flows from the fill device into the microtrench having a width of less than 2 inches and a depth of 2 inches to 20 inches.

6. The method according to claim 1, wherein the roadway comprises asphalt or concrete.

7. The method according to claim 1, wherein the aggregate comprises sand.

8. The method according to claim 1, wherein the aggregate comprises spoil formed by ground up roadway from cutting the microtrench in the roadway.

9. The method according to claim 1, further comprising continuously cutting the microtrench using a microtrencher, continuously laying the optical fiber cable or innerduct/microduct within the microtrench, and the fill device following behind the microtrencher continuously filling the microtrench with the flowable concrete-based fill.

10. The method according to claim 9, further comprising continuously transporting at least a portion of a spoil from the microtrencher to a first container constructed to contain the spoil using at least one spoil transporting device; and continuously laying the cable and/or innerduct/microduct in the microtrench from a reel device.

11. The method according to claim 10, wherein the steps of continuously transporting the spoil from the microtrencher to the first container constructed to contain the spoil using the at least one spoil transporting device and continuously laying at least one of the cable and innerduct/microduct in the microtrench from the reel device are conducted using the micro-trencher using a multifunctional reel carrier, spoil material handling container device comprising:
a first truck or first trailer;
the first container constructed to contain the spoil being on the first truck or first trailer; and
the at least one spoil transporting device constructed to transfer the spoil from the micro trencher and deposit the spoil in the first container.

12. The method according to claim 11, further comprising using the at least one spoil transporting device to transport the at least a portion of the spoil from the first container to the fill device, wherein the aggregate comprises at least a portion of the spoil.

13. A roadway having a color-matched, filled and sealed microtrench containing an optical fiber and/or innerduct/microduct formed solely by a flowable concrete-based fill that filled the microtrench according to the method of claim 1.

14. A method of continuously filling and sealing a microtrench containing an optical fiber and/or innerduct/microduct on a roadway to return the roadway to substantially an original state with a filled and sealed microtrench comprising:
forming a flowable concrete-based fill in a fill device by mixing together a cement, a polymer bonding agent, an aggregate, and water, wherein the polymer bonding agent provides adhesion to the existing roadway, and a cement accelerator and/or calcium sulfoaluminate cement in an amount to provide the flowable concrete-based fill with a final set time of 1 hour or less, and the flowable concrete-based fill is configured to flow into the microtrench from the fill device; and
continuously filling the microtrench with the flowable concrete-based fill material from the fill device to simultaneously cover the optical fiber and/or innerduct/microduct, fill and seal the microtrench and return the roadway substantially back to the original state with the filled and sealed microtrench.

15. The method according to claim 14, further comprising forming the flowable concrete-based fill in real time and filling the microtrench by the fill device in real time.

16. The method according to claim 14, further comprising mixing the cement accelerator into the flowable concrete-based fill in an amount to provide the fill with the final set time of less than 1 hour.

17. The method according to claim 14, wherein the cement comprises the calcium sulfoaluminate cement in an amount to provide the fill with the final set time of less than 1 hour.

18. The method according to claim 14, further comprising forming the flowable concrete-based fill so that the flowable concreted-based fill flows from the fill device into the microtrench having a width of less than 2 inches and a depth of 2 inches to 20 inches.

19. The method according to claim 14, wherein the roadway comprises asphalt or concrete.

20. The method according to claim 14, wherein the aggregate comprises sand.

21. The method according to claim 14, wherein the aggregate comprises spoil formed by ground up roadway from cutting the microtrench in the roadway.

22. The method according to claim 14, further comprising continuously cutting the microtrench using a microtrencher, continuously laying the optical fiber cable or innerduct/microduct within the microtrench, and the fill device following behind the microtrencher to continuously fill the microtrench with the flowable concrete-based fill from the fill device.

23. The method according to claim 22, further comprising continuously transporting at least a portion of a spoil from the microtrencher to a first container constructed to contain the spoil using at least one spoil transporting device; and continuously laying the cable and/or innerduct/microduct in the microtrench from a reel device.

24. The method according to claim 23, wherein the steps of continuously transporting the spoil from the microtrencher to the first container constructed to contain the spoil using the at least one spoil transporting device and continuously laying at least one of the cable and innerduct/microduct in the microtrench from the reel device are conducted using the micro-trencher using a multifunctional reel carrier, spoil material handling container device comprising:
a first truck or first trailer;
the first container constructed to contain the spoil being on the first truck or first trailer; and
the at least one spoil transporting device constructed to transfer the spoil from the micro trencher and deposit the spoil in the first container.

25. The method according to claim 24, further comprising using the at least one spoil transporting device to transport the at least a portion of the spoil from the first container to the fill device, wherein the aggregate comprises at least a portion of the spoil.

26. A roadway having a filled and sealed microtrench containing an optical fiber and/or innerduct/microduct formed solely by a flowable concrete-based fill that filled the microtrench in one step according to the method of claim 14.

* * * * *